Oct. 30, 1928.  
F. G. FOLBERTH ET AL  
1,690,004  
WINDSHIELD CLEANER  
Filed April 20, 1925
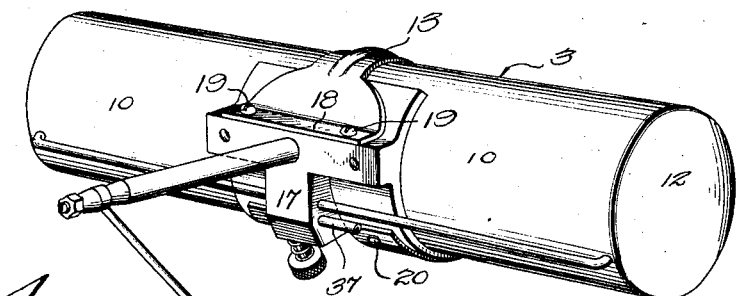
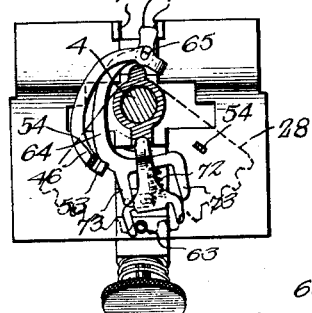
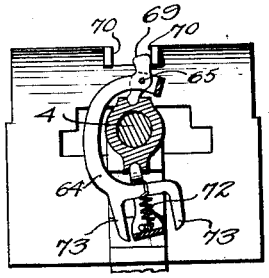
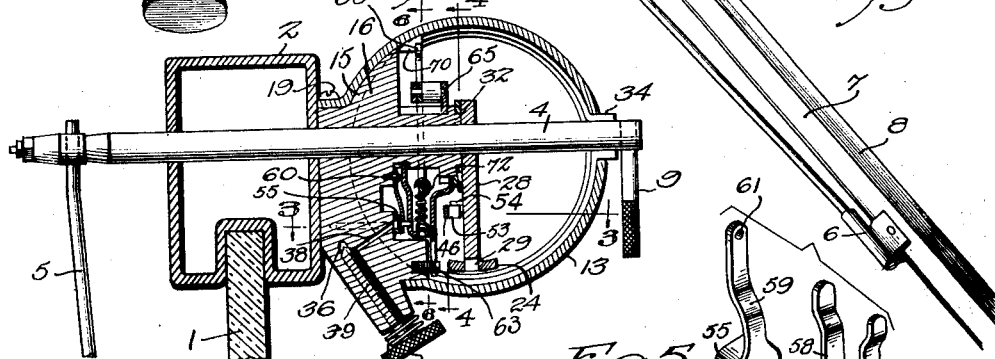
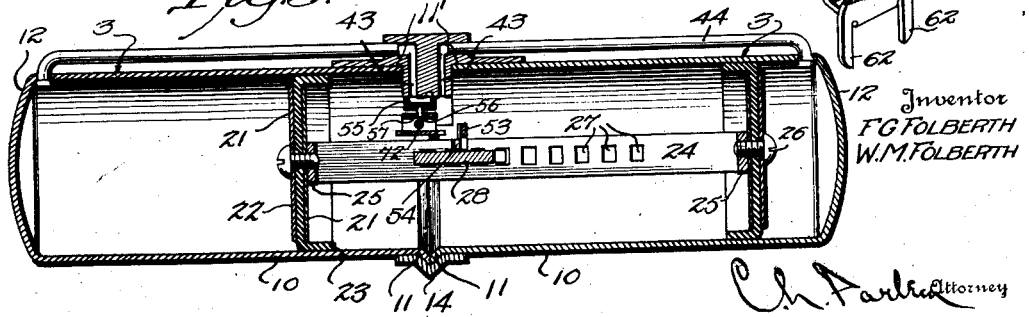
Inventor  
F.G. FOLBERTH  
W.M. FOLBERTH Patented Oct. 30, 1928.

1,690,004

UNITED STATES PATENT OFFICE.

FREDERICK G. FOLBERTH AND WILLIAM M. FOLBERTH, OF CLEVELAND, OHIO, ASSIGNORS TO TRICO PRODUCTS CORPORATION, OF BUFFALO, NEW YORK, A CORPORATION OF NEW YORK.

WINDSHIELD CLEANER.

Application filed April 20, 1925. Serial No. 24,601.

This invention relates to windshield cleaners, and more particularly to valve actuating mechanism therefor.

In windshield cleaners of the type described and claimed in the prior patent to William M. Folberth, No. 1,405,773, granted February 7, 1922, there is provided automatic valve shifting mechanism controlled by a movable part of the motor and adapted to place the motor casing on opposite sides of the movable member in communication with a source of suction.

The valve is generally shifted by means of a spring in which energy is stored during the early portion of the stroke of the movable member to snap the valve from one position to another as the piston approaches the end of its stroke.

In the present invention, we provide a construction in which the movable lever assists the spring in shifting the valve, thus permitting the use of a weaker spring and providing a more silent valve shifting mechanism.

An object of the invention is to insure the shifting of the valve even though the valve is "frozen" or stuck to its seat.

In the accompanying drawings, I have shown several embodiments of the invention. In this showing:

Figure 1 is a perspective view of the windshield cleaner,

Figure 2 is a central transverse vertical sectional view showing the device in position on a windshield, Figure 3 is a horizontal sectional view of the device removed from the windshield, substantially on line 3—3 of Figure 2, Figure 4 is a vertical sectional view on line 4—4 of Figure 2, with the parts of the motor casing removed, Figure 5 is a detailed perspective view of the valve supporting member and valve, and, Figure 6 is a view similar to Figure 4 taken on line 6—6 of Figure 2.

The motor and valve mechanism shown in the accompanying drawings is substantially similar to that shown in our copending application on windshield cleaners, filed October 17, 1924, Serial No. 744,269, with the addition of the improvements forming the subject matter of the present invention.

In the drawings, the reference numeral 1 designates a windshield of a motor vehicle formed of glass or other transparent material and mounted in a suitable frame 2. The windshield cleaner consists of a motor 3 adapted to be arranged on the windshield frame and secured thereto in any suitable manner. The motor is provided with a transverse shaft 4 which extends through the frame and a cleaner arm 5 is secured thereto adjacent its outer end. The cleaner arm is provided with a holder on its lower end adapted to receive a cleaner element consisting of a backing strip 7 of metal or other rigid material and a strip of rubber 8 which is adapted to contact with the surface of the windshield to be cleaned. The motor shaft also extends from the inner side of the motor casing and is provided with a handle 9 to permit manual operation.

As shown (see Figure 3), the motor is formed of two cup-like sections 10 which may be formed of drawn sheet metal and which are provided with flared inner ends 11. As shown, the outer ends of the motor sections are closed, as at 12, forming the heads of the cylinder, and the inner ends are adapted to be secured to each other to form a cylinder. A band 13 of resilient material is arranged adjacent the junction of the two ends of the two sections of the cylinder and partially encircles the meeting edges of the cylinder section to secure them to each other (see Figure 2). This band is provided with a V-shaped groove 14 on its inner face adapted to receive the flared ends of the cylinder sections. The portion of the cylinder sections not encircled by the band is provided with recesses 11' adapted to receive a closure plate 15. This construction provides for the ready ingress and egress of atmospheric pressure at the center of the casing or cylinder. This closure plate is curved in cross section and is adapted to extend partially around the cylinder. The inner face of the closure plate is provided with an enlargement 16 adapted to form a support for the valve and valve operating mechanism. A T-shaped rib or boss 17 is arranged on the exterior of the closure plate and the upper end of the clamping band is enlarged, as at 18, and is secured to the top of this rib by means of screws 19. The lower end of the band is provided with openings adapted to receive lugs 20 (see Figure 1) projecting from the face of the closure plate.

A pair of pistons are arranged within the cylinder and retained in spaced relation. As shown, each piston comprises a pair of disks 21 of metal or other rigid material. These disks are slightly smaller in diameter than the internal diameter of the cylinder and a sheet of packing 22 is arranged between them. As shown, the sheet of packing is of greater diameter than the cylinder and forms a skirt 23. The pistons are connected to each other by a connecting member 24, preferably formed of sheet metal and provided with ends 25 extending at an angle to the body of the connecting member. Screws 26 are arranged in openings in the disks 21 and the ends 25 of the connecting member. As shown, the connecting member is provided with spaced openings 27 and is adapted to serve as a rack in transferring the movement of the pistons to the shaft. A segmental gear 28 is fixed on the shaft and has its teeth 29 meshing with the teeth 27 of the rack.

The enlargement 16 on the inner face of the closure plate is provided with an inwardly extending sleeve 32, forming a bearing for the shaft, and the shaft extends through an opening formed in this sleeve and passing through the closure plate. The other end of the shaft is received in a bearing 34 formed in the ends of the cylinder sections.

The opposite ends of the cylinder are adapted to be connected to a source of suction by means of passages extending through the closure plate. As shown, the closure plate is provided with a main suction passage 36 having a tube 37 arranged therein and the end of the tube is adapted to be connected to a source of suction, such as the intake manifold of an internal combustion engine (not shown) by means of a suitable conduit (not shown). As shown, the main suction passage extends transversely of the T-shaped rib on the exterior of the closure plate or longitudinally of the cylinder. The end of this passage communicates with an inclined passage 38, extending inwardly to the inner face of the enlargement 16 (see Figure 2). Suitable means are provided for manually controlling the passage of fluid through the passages 36 and 38. An inclined passage is formed in the T-shaped rib adjacent the junction of the passages 36 and 38 and this inclined passage is internally threaded for the reception of a valve stem 39. The inner end of the valve stem is adapted to engage a seat at the junction of the two passages to disconnect the passages from each other. The outer end of the stem is provided with a suitable handle 41 and a spring 42 is arranged on the projecting portion of the stem.

A cylinder passage 43 (see Figure 3) is arranged on each side of the suction passage 38 and these passages extend outwardly in a substantially horizontal plane, as shown in Figure 2 of the drawings. The outer ends of these passages extend longitudinally through the T-shaped rib and suitable tubes or conduits 44 which extend longitudinally of the cylinders, connect the passages to the opposite ends of the cylinders through suitable openings arranged adacent each end.

In the valve actuating mechanism forming the subject matter of our copending application Serial No. 744,269, heretofore referred to, there is provided a lever 46 which is substantially semi-circular in shape to fit around the sleeve 32 and which is pivotally mounted on the sleeve. The lower end of this lever is provided with an offset arm 53 adapted to be engaged alternately by spaced lugs 54 on the adjacent face of the segmental gear 28 to shift the lever on its pivot. A substantially cup-shaped valve 55 is arranged on the inner face of the enlargement 16 and is adapted to cover the central suction passage 38 and either one of the cylinder passages 44 to establish communication between the source of suction and either end of the cylinder (see Figure 3). The valve is provided with a stem 56 adapted to be received in an opening 57 in one of the arms 58 of a substantially U-shaped valve shifting member. Heretofore, the size of the opening in the arm 58 has been substantially the same as the size of the stem to snugly receive it and the valve has been held on its seat by the valve shifting member. As shown (see Figure 5) in the present invention, the opening is elongated to permit slight relative movement of the valve shifting member and the valve, and the valve is forced toward its seat by means of a leaf spring 59. This spring which constitutes a valve carrier or supporting member is provided with an opening adjacent its lower end to receive the valve stem 56 and is secured to the face of the enlargement 16 by means of a bolt 60, received in an opening 61 adjacent the top of the spring.

The valve shifting member is pivotally mounted on the lower face of the sleeve 32 and movement on its pivot is limited by a pair of depending arms 62 adapted to engage a stop 63 carried on the face of the enlargement. This stop may be formed of a coil spring having one end received in a suitable opening in the enlargement, the use of a spring serving to materially reduce the noise occasioned by the shifting of the valve. The valve shifting member and the valve actuating lever 46 are connected to each other by means of a coil spring and a floating lever. As shown, the floating lever consists of a substantially semi-circular member 64, adapted to fit around the sleeve 32 and pivotally mounted on a pin or roller 65, carried by the actuating lever 46. The upper end of the floating lever is provided with an arm or extension 69 received in a cut out portion of the closure plate. The ends of this cut out portion form shoulders 70 which are adapted to be engaged by the arm 69 to limit the movement of the floating lever. The floating lever is provided with a seat adjacent its lower end, adapted to receive one end of a coil spring 72 and the other end of the spring is connected to the base of the U-shaped valve shifting member.

In order to insure shifting of the valve shifting lever, the floating lever may be provided with depending arms 73 which will engage opposite sides of the valve shifting lever, if the valve shifting lever is not shifted by the spring when the floating lever moves from one position to another.

The general operation of the device is substantially the same as that described in our co-pending application heretofore referred to. The cleaner motor is connected to the source of suction in the usual manner, and the valve actuating lever 46 is swung on its pivot by a movable part of the motor.

With the parts of the device in the position shown in Figures 4 and 6 of the drawings, the next movement of the valve actuating lever is in a counter-clockwise direction. As the floating lever is connected to the valve actuating lever, the first portion of the movement of the valve actuating lever moves the floating lever from the position shown in Figures 4 and 6 of the drawings, wherein it is in engagement with the right stop 70, to a position in engagement with the left stop. During this movement, the lower end of the floating lever moves toward the left, placing the spring 72 under tension. At the time that the valve actuating lever passes the central position, the movement of the floating lever is arrested by the shoulder 70. Further movement of the valve actuating lever toward the left causes the valve shifting member to swing toward the right, with the upper end thereof serving as a pivot, and as the lower end moves the spring 72 beyond the center, the valve is shifted to the left. In prior constructions, the valve has been rigidly mounted on the valve shifting member, necessitating a valve spring 72 of sufficient strength to overcome the suction existing in the passage 38 which draws the valve to its seat. By providing the supplemental valve carrier or spring 59 for the purpose of supporting the valve, the elongated slot 57 in the valve shifting member may be employed with the result that the valve shifting member tends to move before the valve and is in motion when the pin 57 is engaged by the end of the slot, thus permitting the shifting of the valve with less expenditure of force and permitting the use of a weaker shifting spring 72.

The depending arms 73 of the floating lever are for the purpose of engaging the sides of the bases of the valve shifting member in the event that the sliding valve sticks to its seat and initially moving this member. This eliminates the possibility of the valve becoming "frozen" on its seat and also permits the use of a weaker spring 72, reducing the noise incidental to shifting the valve.

It is to be understood that the form of our invention herewith shown and described is to be taken as a preferred example of the same and that various changes in the shape, size, and arrangement of parts may be resorted to without departing from the spirit of the invention or the scope of the subjoined claims.

We claim:

1. A snap over valve mechanism for fluid motors comprising a valve shifting member, a spring connected to said valve shifting member to effect movement thereof, means actuated by the movement of a movable part of the motor to store up energy in said spring to effect movement of the valve shifting member, a valve loosely connected to said valve shifting member to permit slight independent movement thereof, and valve supporting means resiliently retaining said valve on its seat.

2. A snap over valve mechanism for fluid motors comprising a valve shifting member, a spring connected to said valve shifting member to effect movement thereof, means actuated by the movement of a movable part of the motor to store up energy in said spring to effect movement of the valve shifting member, a valve loosely connected to said valve shifting member to permit slight independent movement thereof, and a leaf spring pivoted at one end and connected at its opposite end to said valve to support and retain it on its seat.

3. A valve mechanism for windshield cleaner motors, comprising a valve, a pivoted valve carrier yieldably pressing the valve to its seat, a rockable valve shifting member having a play connection with said valve to permit an initial idling movement of said shifting member preliminary to shifting the valve, and resilient means operable from a moving part of the motor to store up energy therein during the idling movement of the shifting member, for expenditure on the latter to effect a shift of the valve.

4. Valve mechanism for windshield cleaner motors, comprising a support, a rockable valve shifting member pivoted at one side thereon, a lever pivoted at the opposite side on said support and movable from a moving part of the motor, a spring connecting the member to the lever and movable by the latter to opposite sides of the mounting of said member to permit said spring to snap said member back and forth about its mounting, said spring holding both said member and said lever against displacement from the support, said lever having spaced arms extending on opposite sides of said member for engaging the same to initiate movement of the member in the event the latter does not move under the action of the spring, and a valve having a play connection with and operable by said member.

5. Valve mechanism for windshield cleaner motors, comprising a support, a rockable valve shifting member pivoted thereon, a lever pivoted on said support and movable from a moving part of the motor, a spring connecting the member to the lever and movable by the latter to opposite sides of the mounting of said member to permit said spring to snap said member back and forth about its mounting, said lever having spaced arms extending on opposite sides of said member for engaging the same to initiate movement of the member in the event the latter does not move under the action of the spring, a pivotally mounted leaf spring, and a valve swingingly carried by said leaf spring and having a play connection with said shifting member.

6. A valve mechanism for windshield cleaner motors, comprising a support, a rockable valve shifting member having spaced arms pivoted on said support, a lever member having a part extending between the arms of said shifting member, said part having spaced arms straddling the shifting member and engageable therewith, a spring connecting the lever member to the shifting member at a point between the spaced arms of each member, a second lever member pivoted on the support and pivotally supporting said first lever member, spaced stop portions with which said first lever member is alternately engageable by said second lever member to serve as fulcrum supports for said first lever member whereby said first lever member will act to position said spring for operating said shifting member, said second lever member being operable with a moving part of the motor, and a valve having a play connection with and shiftable by said shifting member.

7. A valve mechanism for fluid motors comprising a support, a valve, a valve shifting member rockable on the support, a spring connected at one end to the shifting member to operatively position the same, a lever having its longer arm connected to the opposite end of the spring, said longer arm having spaced parts for alternately engaging said shifting member to initiate movement thereof in the event that said shifting member does not move under the action of the spring, spaced stops with which the shorter arm of said lever is alternately engageable to fulcrum thereon when positioning the spring, and a member movable back and forth by and during movement of a movable part of the motor and carrying said lever to first bring said shorter arm of said lever alternately into engagement with said stops and then continue the movement of said lever about the engaged stops as a fulcrum to effect a spring-positioning movement of said longer arm and a movement of said arm parts respectively into engagement with said shifting member in the event the latter does not move under the action of said spring.

In testimony whereof, we affix our signatures.

FREDERICK G. FOLBERTH.
WILLIAM M. FOLBERTH.